Figure 1:
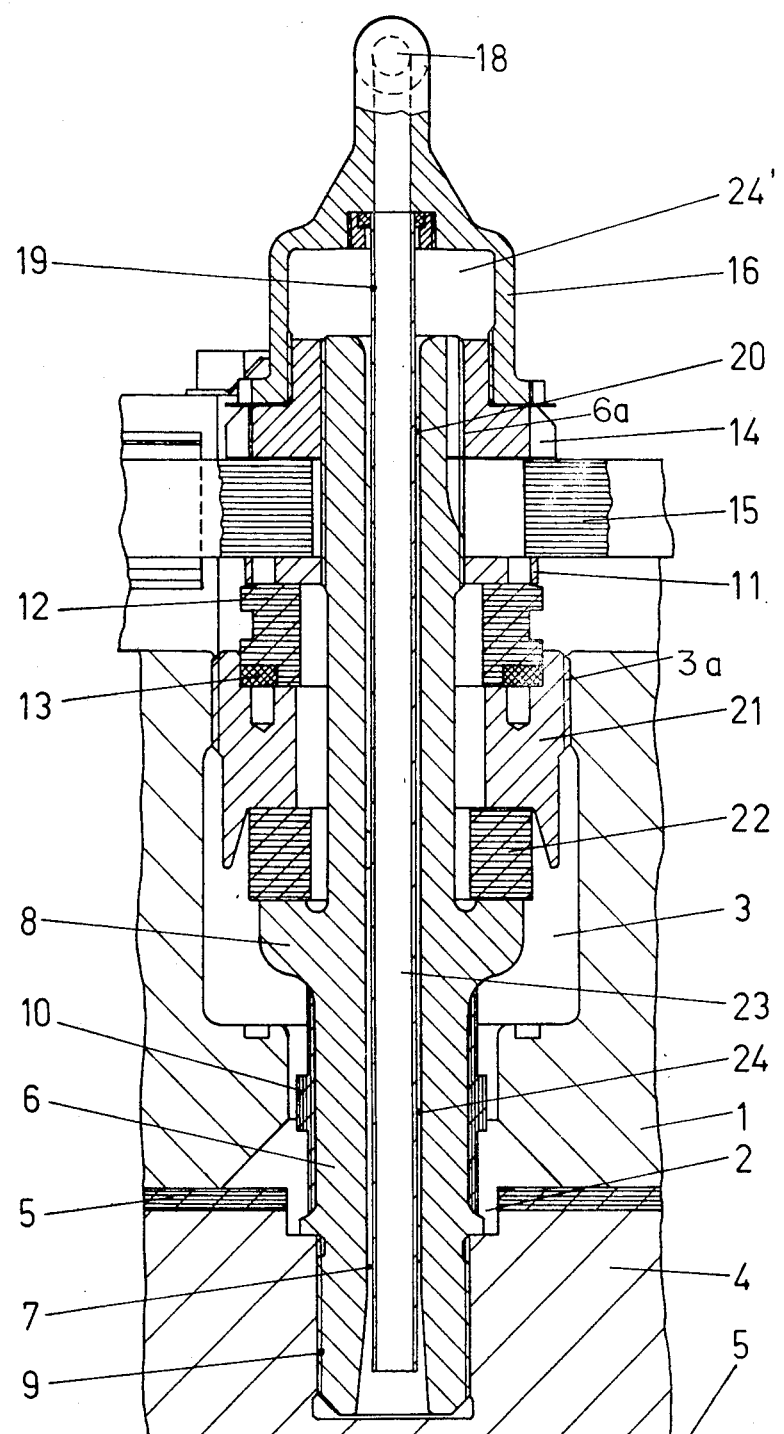

United States Patent [19]
Haditsch et al.

[11] 4,074,155
[45] Feb. 14, 1978

[54] INTERNALLY AIR COOLED EXCITER-CURRENT LEAD-THROUGH BOLT INTERCONNECTING ROTOR SHAFT-ENCLOSED LEAD-IN CONDUCTOR BAR AND TERMINAL CONDUCTOR BAR LEADING TO ROTOR WINDING

[75] Inventors: Werner Haditsch, Nussbaumen; Hansruedi Rutz, Wettingen; Ernst Toplak, Windisch, all of Switzerland

[73] Assignee: BBC Brown Boveri & Company Limited, Baden, Switzerland

[21] Appl. No.: 645,322

[22] Filed: Dec. 30, 1975

[30] Foreign Application Priority Data

Jan. 16, 1975 Switzerland ............... 524/75

[51] Int. Cl.² .................................... H02K 9/00
[52] U.S. Cl. ........................................... 310/59
[58] Field of Search ............... 310/61, 59, 58, 52, 310/60, 64, 65, 53, 57, 71, 165, 231, 261, 232, 68, 680, 112–114

[56] References Cited

U.S. PATENT DOCUMENTS

| 3,034,003 | 5/1962 | Seidner | 310/64 |
|---|---|---|---|
| 3,359,438 | 12/1967 | Hylen | 310/68 |
| 3,393,333 | 7/1968 | Kudlacik | 310/61 |
| 3,457,440 | 7/1969 | Horsley | 310/52 |
| 3,571,634 | 3/1971 | Sato | 310/61 |
| 3,733,502 | 5/1973 | Curtis | 310/61 |
| 3,808,490 | 4/1974 | Khutoretsky | 310/231 |
| 3,878,413 | 4/1975 | Madsen | 310/59 |
| 3,894,253 | 7/1975 | Willyoung | 310/61 |
| 3,955,111 | 5/1976 | Weghaupt | 310/64 |

*Primary Examiner*—R. Skudy
*Attorney, Agent, or Firm*—Pierce, Scheffler & Parker

[57] ABSTRACT

An exciter-current lead-through bolt which is passed through a radial bore in the rotor shaft of a dynamoelectric machine, especially a turbo-generator, and screwed into an exciter-current lead-in conductor bar which lies in a longitudinally extending bore within the shaft. The radially outer part of the lead-through bolt is mechanically and electrically connected with a terminal conductor bar leading to the exciter winding located on the rotor. The lead-through bolt preferably made of steel because of its high mechanical strength is cooled internally by means of a forced air circulation system including a tube inserted in a longitudinal bore through the bolt, the diameter of the bore being greater than the external diameter of the tube in order to provide an annular space therebetween for flow of air from an air inlet port outside of the shaft radially inward to the end of the tube adjacent the inner end of the bolt, then into the tube and radially outward therethrough to an air discharge port also located outside of the rotor shaft and at a radial distance greater than the air inlet port.

4 Claims, 3 Drawing Figures

INTERNALLY AIR COOLED EXCITER-CURRENT LEAD-THROUGH BOLT INTERCONNECTING ROTOR SHAFT-ENCLOSED LEAD-IN CONDUCTOR BAR AND TERMINAL CONDUCTOR BAR LEADING TO ROTOR WINDING

This invention relates to an improved construction for an exciter-current lead-through bolt which is passed from the outside into a radial bore in the rotor shaft of a dynamoelectric machine, especially a turbo-generator, the inner end of the bolt, which is electrically conductive, being mechanically and electrically connected to an exciter-current lead-in conductor which extends longitudinally through a bore provided in the shaft, and the outer portion of the bolt being both mechanically and electrically connected to a terminal conductor for the exciter winding located in slots along the length of the rotor surface.

Since turbo-generator units used for the production of electrical energy are steadily increasing in power output, an increase in exciter power is also necessary, i.e. the exciter current which is passed through exciter windings located on the rotor component of the machine must be increased. It is standard practice to locate the exciter-current lead-in conductors within a bore extending longitudinally within the shaft. These lead-in conductors are usually of the rigid bar type and are suitably insulated from the shaft and from one another, and are electrically connected with the exciter winding on the rotor by means of exciter-current lead-through bolts which are inserted through radial bores in the shaft and screwed into threaded recesses provided in the lead-in conductor. An exciter-current lead-through bolt of this general type is disclosed in the published German Pat. DOS No. 1,813,867.

Because of the high order exciter currents required for turbo-generators which deliver high power outputs, a single exciter-current lead-through bolt extending between and interconnecting exciter-current lead-in conductors with each phase of the exciter winding has become insufficient to carry the necessary exciter phase current and hence it has become necessary to utilize two parallel spaced exciter-current lead-through bolts to carry the current, these parallel arranged bolts being connected at their outer end portions with insulated terminal conductor bars leading to the phase windings per se and which are located in slots extending longidutinally along the surface of the rotor.

The use of such parallel arranged and electrically parallel connected exciter-current lead-through bolts is known, and alloys as well as steel have been used as the bolt material. Bolts made from alloyed materials are advantageous because of the very good electrical conductivity whereas steel bolts have a lower conductivity factor but offer greater mechanical safety due to their substantially greater strength. If two such bolts arranged in parallel are used, it becomes necessary to take into consideration not only their high tensile load but also additional bending stresses which are caused by the fact that the bolts, coupled to one another, are forced into an angular position relative to each other due to bending of the shaft. The original "rectangular" system, formed by the coupling of the rigid lead-in conductor bars, bolts and terminal conductor bars is displaced into a non-rectangular parallelogram having two oppositely located obtuse interior angles and two oppositely located acute interior angles, thus resulting in additional bending stresses on the bolts at their points of rigid fixation to the lead-in conductor bars and the winding terminal conductor bars. The movement of the bolt located further away from the actual winding will be greater than that of the bolt located closer to the winding because the latter is held more securely in its position by the winding terminal conductor bars seated within a shaft groove. If the bolts are braced additionally by means of a ring nut screwed onto a threaded portion of the bolt extending for about half its length, the bolts will be subjected at this point of fixation to particularly adverse influences. Due to these circumstances, which have been affirmed by practical tests, an exciter-current lead-through bolt made of steel will be highly advantageous over bolts made from an alloy for constructions where two such bolts arranged in spaced parallel relation are used since the former will be better able to withstand these additionally imposed bending stresses without undue consequences. However, in order to meet the high electrical, i.e. current loads to be carried by these parallel steel bolts they must be intensively cooled in order to overcome the disadvantage of their lower electrical conductivity in comparison to bolts of the same size made from alloys.

The primary object of the present invention is to provide an improved structure for exciter-current through-bolts which enables them to carry higher current loads, this being achieved by building into them an internal cooling system. Thus for bolts of the same size, a bolt made of steel and provided with internal cooling in accordance with the invention will have the same current-conducting capacity as a bolt made from alloys and will have the additional advantage over alloy bolts of a much greater physical strength.

In a preferred embodiment of the invention, to be described, the desired internal cooling of the exciter-current lead-through bolt is established by a forced air circulation system which includes a tube inserted in an axial through-bore provided in the bolt, the diameter of the through-bore being greater than the external diameter of the tube so as to establish an annular passageway therebetween through which cooling air is induced to flow radially inward from an air intake port at the outer end of the bolt to a point near the inner end thereof, thence into the inner end of the tube and outwardly through the same to an air discharge port located radially outward of the air intake port. The air intake port faces towards the direction of rotation of the shaft, the air discharge port faces away from the direction of shaft rotation, and the radial difference between the respective locations of the air intake and air discharge ports produces, by centrifugal action, the desired forced circulation of cooling air through the bolt as the rotor rotates.

Preferably, the tube which is inserted into the axial through-bore in the bolt is carried by a ventilator hood secured to the outer end of the bolt, this hood being provided with an air intake port in the wall thereof by which air is forced into an annular space surrounding the tube at the outer end of the bolt. The air discharge port is located at the outer end of the hood opening from an axial passage in alignment with the outer end of the tube.

It is particularly advantageous to support the exciter-current lead-through bolt at a collar portion thereon which includes a well rounded off transition face joining it with the cylindrical portion of the bolt which is entered into the bore of the shaft and screwed into a threaded recess at its radially inner end. An externally threaded nut surrounding the bolt and screwed radially inward in another threaded portion of the radial bore in the shaft applies axial pressure against the opposite face of the collar with an insulating washer inserted therebetween. This additional shouldered support for the bolt provides a safeguard against cenntrifugal forces and does not possess any notch sensitivity because of the well rounded off transition surface from the cylindrical part of the bolt.

It is also advantageous to utilize exciter-current lead-through bolts in pairs, the bolts of each pair being inserted through separate radial bores in the shaft into a lead-in conductor and the bolts of each pair being electrically and mechanically interconnected to a winding terminal conductor bar leading to the rotor winding.

Figure 2:
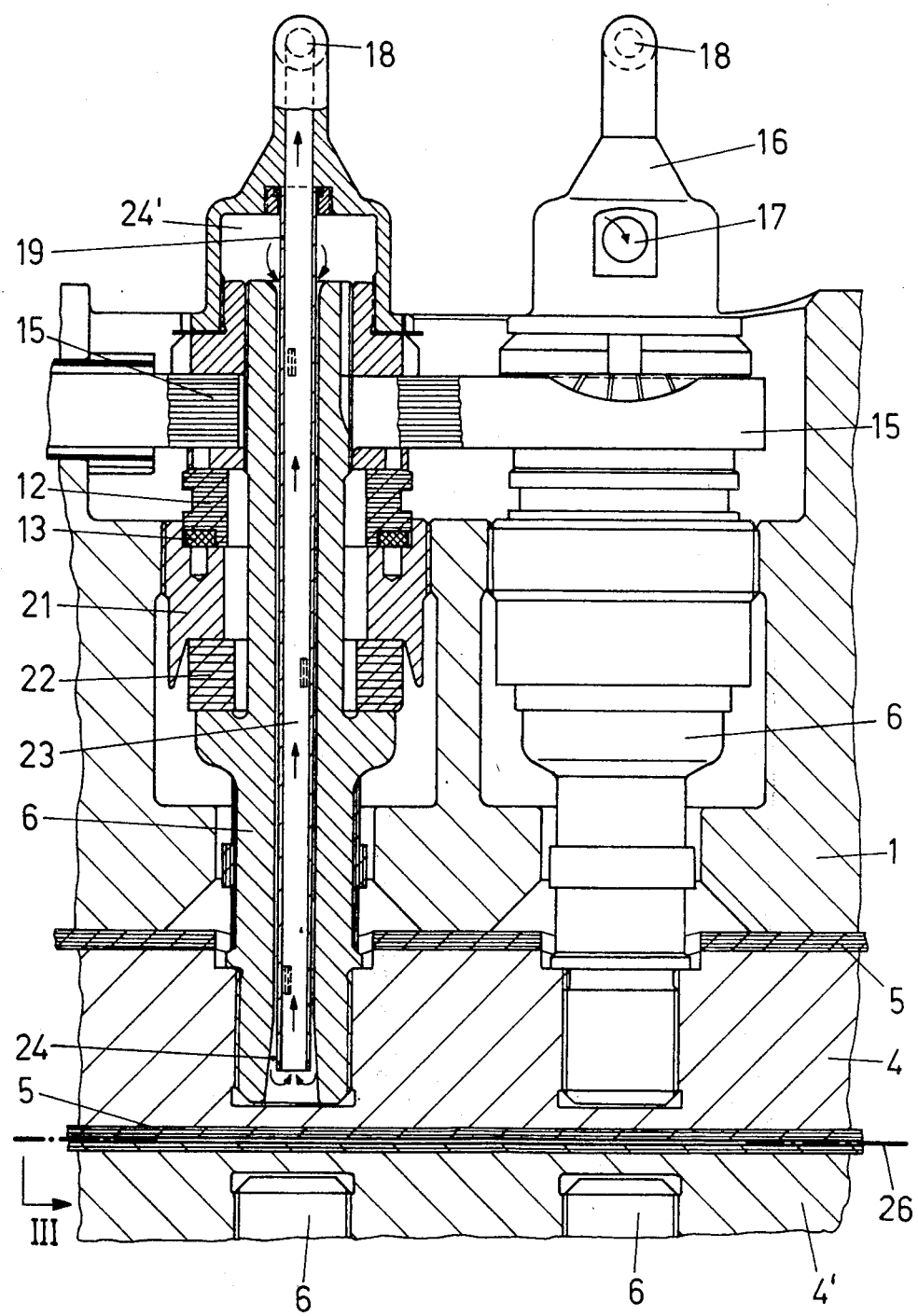
Figure 3:
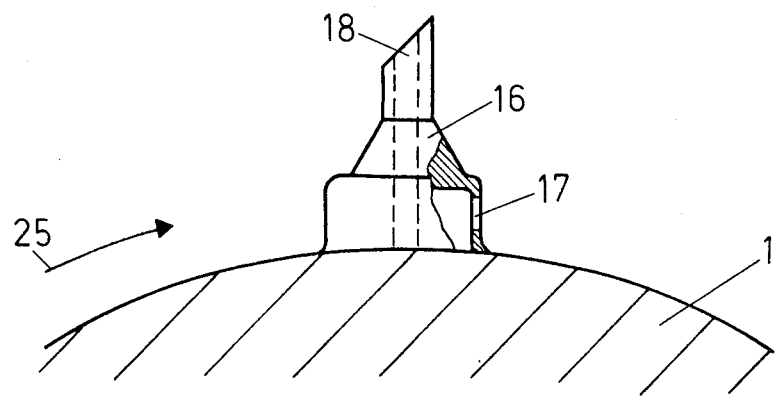
Figure 3:
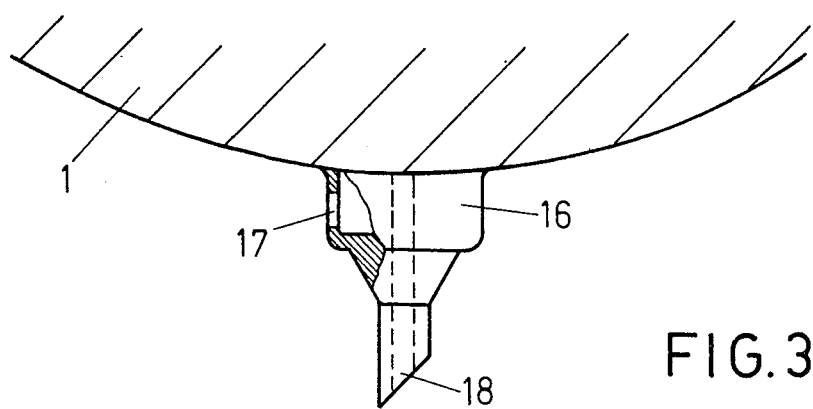

A preferred embodiment of the invention is illustrated in the accompanying drawings wherein:

FIG. 1 is a central longitudinal sectional view of the improved exciter-current lead-through bolt structure mounted in the rotor shaft, FIG. 2 is a similar view showing a pair of the improved exciter-current lead-through bolt structures located in side-by-side relation in the rotor shaft, one of the bolts being shown in central longitudinal section and the other in elevation, and FIG. 3 is a broken view showing opposite portions of the rotor shaft together with the outwardly projecting hood members secured to the radially outer ends of the bolts and which provide the air inlet and outlet structures by which cooling air is force-circulated through the two pairs of bolts which extend radially in opposite directions from the interior of the rotor shaft when the rotor is in operation.

With reference now to the drawings, the entire rotor component of the dynamo-electric machine which is provided with an exciter winding has not been included in order to simplify illustration and further because the rotor winding structure per se forms no part of the present invention. Rather the invention can be completely understood from the illustrated end portion of the rotor shaft 1 which is provided with a longitudinally extending bore 2 in which the exciter-current lead-in bar type conductors 4 with insulation 5 thereon are located. The rotor shaft 1 also includes a radially extending bore 3 which is stepped in diameter for receiving the exciter-current lead-through bolt 6, it being noted that the radially inner end of the bolt is threaded at 9 so as to enable it to be screwed into a socket formed in the body of the lead-in conductor 4. This radially inner end portion of the bolt 6 is provided with an insulation sleeve 10 so as to suitably insulate it from the wall of the bore 3. Above the insulation sleeve 10 the diameter of bolt 6 gradually enlarges along a well rounded transition to establish a collar portion 8 situated in a larger diametered partially threaded portion of the radial shaft bore 3.

Additional support for the bolt 6 within its radial bore in the shaft 1 to resist centrifugal force is provided by an externally threaded nut 21 surrounding and spaced from the bolt and which is screwed into the internally threaded enlarged part 3a of the bore 3, an annular spacer member 22 made of insulating material being interposed and compressed between nut 21 and the end face of collar 8. In this manner, a pressure directed radially inward is applied by nut 21 against bolt collar 8. This additional shouldered support for the bolt 6 for resisting the effect of centrifugal force as the rotor turns at a comparatively high speed does not possess any undesirable notch sensitivity at the collar due to the presence of its well rounded off transition surface from the main cylindrical part of the bolt.

The radially outer portion of bolt 6 in also threaded 6a to receive a nut 11 which is screwed down upon an annular spacer member 12 made of insulating material surrounding bolt 6 and which is thereby pressed into engagement with the surface of the previously screwed in contact nut 21. A seal ring 13 is interposed between nut 21 and spacer member 12.

The portion of bolt 6 radially outward from nut 11 passes through an opening in the terminal conductor bar 15, the latter being electrically connected to the not illustrated exciter winding located on the rotor, and the upper end of bolt 6 is finally clamped into place by means of another contact nut 14 screwed onto the thread part 6a of bolt 6 and which bears against one side of conductor bar 15 and presses the opposite side thereof against contact nut 11.

In accordance with the invention, the exciter-current conducting bolt 6 is provided with a central longitudinally extending through-bore 7 through which extends a tube 19 having a diameter smaller than that of bore 7 in order to establish an annular passageway 24 therebetween. If desired, the radial spacing between the wall of bore 7 and tube 19 can be maintained by one or more spacer members 20 located along the length of the tube. The radially inner end of tube 19 terminates adjacent the radially inner end of bolt 6 and the radially outer end thereof is carried by a hood member 16 which is internally threaded so that it can be screwed into place on a threaded portion of nut 14. The wall of hood 16 is provided with an air intake port 17 which admits air into an annular space 24' within it and, as indicated by the directional arrows included in FIG. 2, flows radially inward along the annular gap between the wall of bore 7 and tube 19 and thus in heat transfer relationship with the bolt 6. The air then enters the tube 19, passing upwardly through it and is discharged from the air outlet port 18.

The structure of the exciter-current lead-through bolts shown in FIG. 2 is the same as that illustrated in FIG. 1, the only difference being that in FIG. 2, the bolts 6 are arranged in pairs placed side by side. Also, it will be noted that one pair of the bolts extending in one direction into the shaft is connected to one lead-in conductor 4 and another pair of the bolts located opposite to the first pair is connected to another lead-in conductor 4'.

As shown in FIG. 3, the air inlet port 17 into hood 16 for conducting cooling air downwardly through the annular gap between tube 19 and the bore within bolt 6 faces in the direction or rotation 25 of the rotor. However, the air outlet port 18 from hood 16 for discharging air from the upper end of tube 19 faces in the opposite direction. The air inlet port 17 is located radially inward from the air outlet port 18 and thus establishes the necessary centrifugal effect for providing forced air flow through the interior of the bolt for cooling it. The different orientations of the air inlet and outlet ports, as mentioned, also assist in the air flow.

We claim:

1. The combination with a rotor shaft of a dynamo-electric machine including a longitudinal bore containing an insulated exciter-current lead-in conductor bar and a radial bore extending from said longitudinal bore to the surface of the shaft, of a radially extending exciter-current lead-through bolt mounted in and extending through said radial bore, means securing the radially inner end of said bolt in said lead-in conductor bar, means securing the radially outer part to a terminal conductor bar leading to an exciter winding located on said rotor, and means for cooling said bolt comprising a ventilating tube disposed within a longitudinal bore extending through said bolt, said tube being smaller than the bolt bore to establish a gap between said tube and the wall of the bore, and a ventilating hood mounting the outer end of said ventilating tube and which is mounted atop the radially outer end of said bolt in the ambient air, said hood including a first port extending through the wall thereof placing said gap in communication with the ambient air and a second port placing the outer end of said ventilating tube in communication with the amient air, said ports establishing an air inlet and air outlet respectively thereby to establish a circulating flow path for ambient cooling air in one radial direction through said gap and in the opposite direction through said ventilating tube.

2. The invention as defined in claim 1 wherein said first port through said ventilating hood is located at a radial distance smaller than said second port whereby the flow of ambient cooling air is radially inward through said gap and thence radially outward through said ventilating tube.

3. The invention as defined in claim 2 wherein said first port on said hood faces in the direction of rotation of said rotor shaft and said second port faces in the opposite direction.

4. The invention as defined in claim 1 and which further includes an externally threaded nut surrounding said bolt, said nut being screwed into a threaded portion of said radially extending shaft bore and applying a radially inward directed pressure against a collar formed on said bolt by a rounded transition from the bolt surface with an insulation member inserted therebetween.

* * * * *